Figure 1:
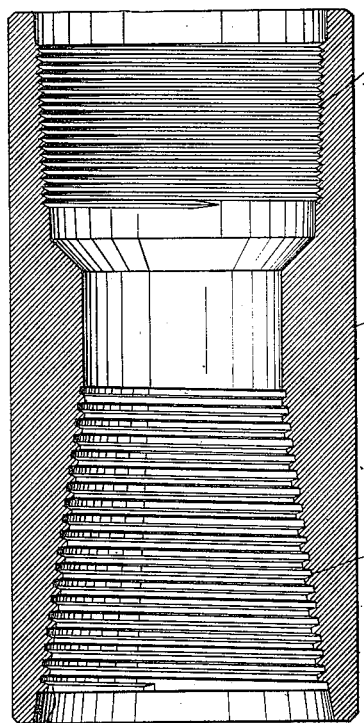

H. W. FLETCHER.
TOOL JOINT.
APPLICATION FILED OCT. 29, 1918.

1,300,365.

Patented Apr. 15, 1919.
2 SHEETS—SHEET 1.

H. W. FLETCHER, Inventor
By His Attorney Jesse R. Stone

H. W. FLETCHER.
TOOL JOINT.
APPLICATION FILED OCT. 29, 1918.
1,300,365.
Patented Apr. 15, 1919.
2 SHEETS—SHEET 2.
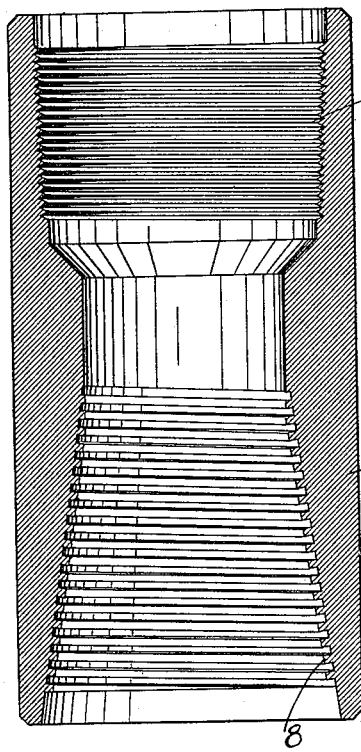
Fig. 4.
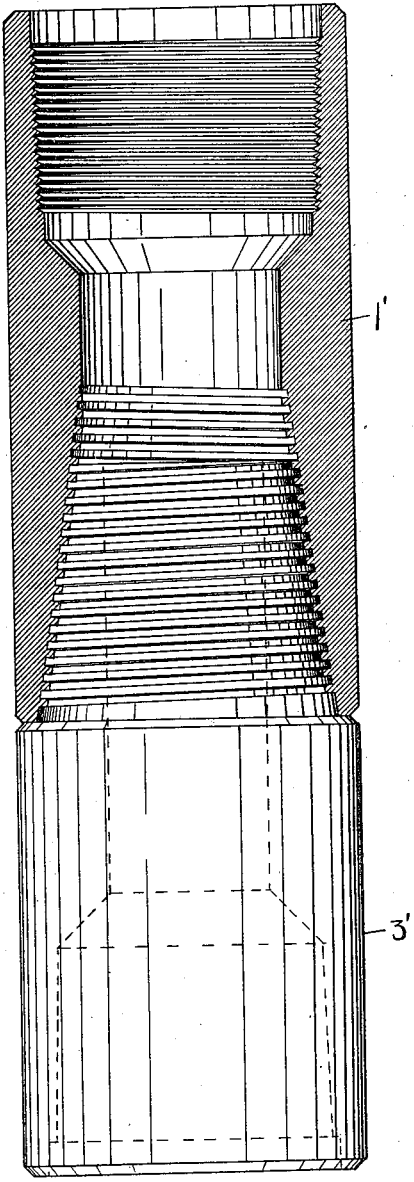
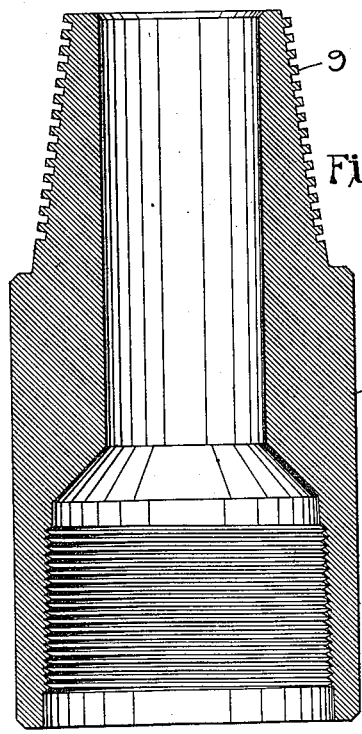
Fig. 5.
Fig. 6.
H. W. FLETCHER, Inventor
By HIS Attorney Jesse R. Stone

UNITED STATES PATENT OFFICE.

HAROLD W. FLETCHER, OF HOUSTON, TEXAS.

TOOL-JOINT.

1,300,365.  Specification of Letters Patent.  Patented Apr. 15, 1919.

Application filed October 29, 1918. Serial No. 260,118.

*To all whom it may concern:*

Be it known that I, HAROLD W. FLETCHER, a citizen of the United States, residing at Houston, Harris county, Texas, have invented a certain new and useful Improvement in Tool-Joints, of which the following is a full, clear, and exact description, such as will enable others skilled in the art to which it appertains to make and use the same.

My invention relates to improvements in tool joints. It has especial application to joints in pipes, or tools for handling the same, in deep well drilling.

In the drilling of oil or water wells it is usually necessary to withdraw the drill from the well at intervals to sharpen the same or to replace broken parts. In performing the withdrawing operation the drill stem, which is of piping, is hauled up and is unscrewed in sections of two or three pipe lengths at a time until the whole stem is withdrawn. To accommodate this frequent unscrewing, every second or third coupling is usually of an improved tool joint construction which can be quickly detached and which will stand the wear of frequent screwing and unscrewing. The drill itself and other well tools are sometimes connected to the drill stem by means of carefully constructed tool joints adapted to withstand wear. When the drill is again introduced into the well after withdrawal, the sections, (each consisting of several lengths of heavy pipe), are again threaded together. In doing this, the weight of each separate section is allowed to rest upon the threaded portions of the joint, and occasionally the new section is allowed to drop upon the upper threaded end of the joint below, thus tending to mutilate the threads. In a lesser degree there is a heavy strain on the threads of the joint in the unscrewing operation. In such case the cable attached to the section being unscrewed exerts a strong upward tension tending to tear the threads apart as the upper section is detached.

The usual construction of tool joint employs a thread tapered at the joint in order to obtain release between the two members thereof by a few reverse turns of the pipe. The threads are comparatively sharp crested and as a result of the heavy weight resting thereon, the threads are bent over and flattened on the top so that when the pipe is rotated to screw the threads of the joint together, crests of some of the threads are broken off and the thickened ends in some plow up the threads with which they contact in such a manner as to ruin the threads thereafter. One object of my invention is to so form the threads upon a tapering tool joint as to make it possible to introduce the parts thereof together under high pressure while they are being mated, without material injury to the threads thereof.

Another object is to form a thread upon a tool joint in such manner that it will be strong and rugged and capable of withstanding the rough and heavy wear incident to deep well drilling.

With these and other objects in view, the advantages of which will more clearly appear in the more detailed description which follows, I have shown two embodiments of my invention, both of which are thought to be novel and useful.

Figure 2:
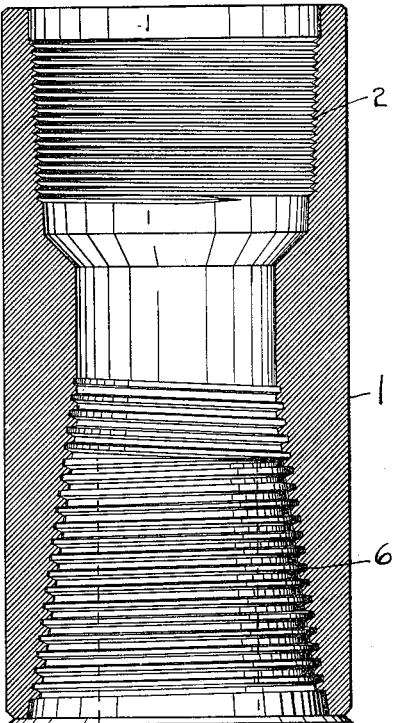
Figure 2:
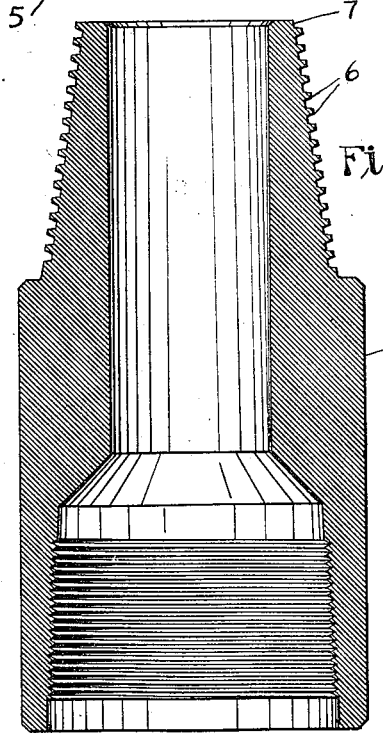
Figure 3:
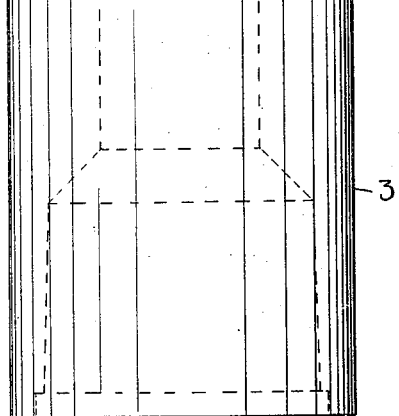

In the drawings forming a part of this specification and in which like parts are designated by like numerals of reference throughout the several views, Figure 1 is a central longitudinal section of the female member of my device showing one type of thread. Fig. 2 is a similar section of the male member thereof, and Fig. 3 shows the two parts in operative position, the male member being in elevation. Fig. 4 shows a central longitudinal section of my device illustrating the female member with a different thread thereon. Fig. 5 is a similar section of the male member adapted to coöperate therewith, while Fig. 6 is an assembled view, similar to Fig. 3 of this embodiment.

The tool joint to which my invention is applied is intended especially for use in making connections in a well where it is difficult to fit the two parts of the joint together without jamming or forcing the one against the other before the parts are rotated to make the joint. Instead of the usual sharp crested threads ordinarily employed, I have conceived the idea of employing a flat crested thread such as is not ordinarily used in tapered joints. Furthermore, the angle at which these threads are cut, relative to the inclined surface on which they are formed, is different, as will shortly appear. In Fig. 1 I have shown the female member, 1, of the joint, such as is usually attached to the upper end of the drill stem as it rests in the rotary. It is a cylindrical coupling having a lower interiorly threaded portion, 2, of ordinary construction, by means of which it is secured to the upper end of the drill stem in the well. The upper end is threaded interiorly at 4 with a thread slightly beveled in cross-section and having a flat crest, as shown at 5. This is a thread similar to the so-called Acme thread sometimes employed on perfectly cylindrical surfaces, but rarely, if ever, used on tapered connections.

This thread differs from any Acme thread, however, by having the axis of the thread perpendicular to the tapered face of the joint. It is customary in cutting threads on any threaded joint to cut the threads in such manner that the axis of the thread (that is the line from the center of the crest to the center of the base of the thread) will be at right angles to the longitudinal axis of the tool joint or pipe itself. By cutting threads at right angles to the bevel of a tapered joint, it is found that the mechanical operations in connection therewith are much simplified. The cutting tool employed in cutting the flat faced thread may be set to cut at right angles to the surface upon which it is working and the thread when thus formed is symmetrical and can be readily checked for accuracy of dimensions.

The male member shown in Fig. 2 has threads cut in the tapered portion in the same manner as are those on the female member. The threads, 6, are flat topped and cut with the axis of the thread at right angles to the tapered surface, 7.

In the modification shown in Figs. 4, 5 and 6, the threads are cut the same as are those in the form just described. The threads, 8, thereon are not tapered but are the usual square threads sometimes employed on cylindrical surfaces. The male threads, 9, are of the same formation and are adapted to fit within the tapered threaded portion of the female member, 1', as shown in Fig. 6.

The advantages of this joint lie mainly in the flat faces on the threads. When the upper male member is lowered into contact with the female member, the parts will contact along the flat faces of the threads. Until the drill stem is rotated to cause the proper threading of one part within the other, the flat faces of the threads will sustain the load of the heavy strain above without bending or breaking the crest of the threads. When the drill stem is rotated the slight forward inclination of the threads will assist in the making of an easy joint. The usual difficulties attending the use of the sharp crested threads will be thus avoided. Such a tool joint will be rugged and durable and easy of operation.

I have disclosed my invention with especial reference to well drilling, but it is obvious that it has a wide application and I do not wish to confine myself to this use alone any further than accords with the appended claims.

What I claim is:

1. A tool joint comprising a female member threaded with an outward taper at one end, a male member tapered to fit therein, the threads being cut on said tapered surfaces with broad flat crests.

2. A tool joint comprising two tapered contacting faces, threads cut on said faces with flat crests thereon, the axis of said threads being perpendicular to the tapered face on which said threads are cut.

3. In a tool joint, the combination of tapered connecting parts, and threads cut thereon with flat crests and forwardly inclined axes.

4. A tool joint comprising two tubular cylindrical coöperating members, one of said members having a tapered seat in one end, the other member having a tapered tap adapted to fit in said seat; the contacting parts threaded for attachment to each other, said threads having flat crests and side faces inclined toward the coöperating member.

In testimony whereof, I hereunto affix my signature this the 16th day of September, A. D., 1918.

HAROLD W. FLETCHER.